2,778,776
Patented Jan. 22, 1957

2,778,776

MANUFACTURE OF 21 HYDROXY STEROIDS

Albert Wettstein and Ernst Vischer, Basel, and Charles Meystre, Arlesheim, Switzerland, assignors to Ciba Pharmaceutical Products Inc., Summit, N. J.

No Drawing. Application June 29, 1955,
Serial No. 518,922

11 Claims. (Cl. 195—51)

This invention relates to the manufacture of steroids by a process in which oxygen is introduced into steroid compounds.

It is already known to introduce hydroxyl groups into steroids, for example into the 21-position thereof, by the use of enzymes from suprarenal glands, especially using homogenates or by perfusion of the intact glands. However interesting this function of animal enzymes may be from a theoretical point of view, it has not been capable of satisfactory practical application for the preparative, and especially industrial production of 21-hydroxy steroids. By the use of microbiological methods, which are also applicable on a large scale, the specified reaction has hitherto been incapable of execution.

We have now discovered that when compounds of the pregnane series, which are unsubstituted in the 21-position, are oxygenated by contact with enzymes produced by aerobic cultures of fungi of the species *Ophiobolus herpotrichus* or *Sclerotinia fructicola*, there results a series of steroids which are hydroxylated in the 21-position. As starting materials for the new process one may suitably employ those compounds of the pregnane series which are unsubstituted in 21-position, among which are the saturated and unsaturated, unsubstituted or substituted derivatives of any configuration of 10,13 - dimethyl - 17 - ethyl-cyclopentano-polyhydrophenanthrene, and also of its higher and lower homologues, for example corresponding A-nor, D-homo- and 19-nor-compounds. Double bonds may occur, for example, in 1-, 4-, 5-, 6-, 7-, 9-, 11-, 14-, 15- and/or 16-position. The preferred starting materials are those whose configuration is that of pregnane, 5α-pregnane, 17α-pregnane or corresponding racemates, such as those obtained in total synthesis. As substituents these compounds may contain free hydroxyl, oxo or carboxyl groups or the corresponding ester, ether, thioester, thioether, thiol ester, thione ester, acetal, mercaptal, ketal, hydrazone, semicarbazone and enol groups, for example in 2-, 3-, 6-, 7-, 11-, 12-, 16-, 17-, 18-, 19- and 20-position, as well as halogen atoms, such as for example chlorine or fluorine, e. g. in 9- and 17-positions. As specific examples of preferred starting materials may be given progesterone, 17α - progesterone, 16α - hydroxy-progesterone, 17α-hydroxy-progesterone, 11-keto-progesterone, 11α- and 11β-hydroxy-progesterone, 9,11- or 11,12-dehydro-progesterone, 19-oxo-progesterone, 11-keto-17α-hydroxy-progesterone, 11α- and 11β-hydroxy-17α-hydroxy-progesterone, 9-chloro- or 9-fluoro-11β,17α-dihydroxy-progesterone, 11β,18-dihydroxy-progesterone, 11β,17,18-trihydroxy-progesterone, 11β-hydroxy-18-oxo-progesterone, 9-chloro- or 9-fluoro-11β-hydroxy-18-oxo-progesterone, 11,18 - dioxo-progesterone, 19-nor-progesterone, 19-nor-11β-hydroxy-18-oxo-progesterone, pregnenolone, the corresponding 1-dehydro compounds, e. g. 1-dehydro-progesterone, 1-dehydro - 17α - hydroxy-progesterone, 1-dehydro-17α-hydroxy-11-ketone-, and -11α- or -11β-hydroxy-progesterone.

The enzymes used are of microbiological origin and produced by aerobic cultures of fungi of the species *Ophiobolus herpotrichus* or *Sclerotinia fructicola*, although other known species of the aforementioned genera may also be suitably employed. For the introduction of oxygen, the starting materials are incubated at a pH between 3 and 8, in most cases directly, with the submerged growth cultures of the specified fungi obtained under known aerobic conditions. These cultures are advantageously agitated, i. e. shaken or stirred. A preferred medium is one which contains a source of assimilable carbon, especially carbohydrates, such as glucose, lactose, glycerol, mannose, and also, if desired, growth promoting substances, for example corn steep liquor or beer worts, and inorganic salts, such as nitrates, chlorides, phosphates, tartrates of sodium, potassium or calcium and the corresponding ammonium salts. Thus natural, synthetic or semisynthetic nutrient solutions can be used.

In a preferred embodiment of the process of this invention, a volume of nutrient medium containing assimilable carbohydrates and inorganic salts is inoculated with a culture of a fungus of the species *Ophiobolus herpotrichus* or *Sclerotinia fructicola*. After a 3 to 5 day period of incubation at a temperature of from about 20° C. to 35° C., a quantity of a pregnane compound unsubstituted in the 21-position is added to the culture medium, preferably in the form of a fine dispersion or a solution in an organic solvent, such as methanol, acetone or ethylene glycol. The mixture is then further incubated for an additional period of from 1 to 5 days, preferably about 3 to 4 days, at the same temperature. The liquor is then separated from the mycelium by a convenient means, such as filtration and the filtrate is extracted with a suitable organic solvent in which the newly formed 21-oxygenated steroid is soluble, such as, for example, ethyl acetate, butyl acetate, methylene chloride, or chloroform. If desired, both the filtrate and the mycelium mass may be extracted in order to insure complete removal of the product. The extract is washed, dried and evaporated, and the 21-oxygenated steroid is separated in pure form by suitable means, such as adsorption on diatomaceous earth followed by elution with organic solvents, as for example chloroform, acetone and mixtures thereof. Alternatively, the product may be purified by adsorption chromatography employing aluminum oxide as the matrix and mixtures of benzene, ether and ethyl acetate as solvents. Another method of purification, which may be advantageously employed, is crystallization from organic solvents, such as acetone, ether, methylene chloride and mixtures thereof. If desired, purification may be accomplished by conversion into functional derivatives, such as Girard compounds. It is to be noted further that the process of this invention can also be advantageously carried out by first separating the active enzymes from corresponding aerobic cultures, for example, by extraction of the well developed mycelium, and using them with the exclusion of the growing cultures.

The products resulting from the process of this invention are known, therapeutically useful compounds. Some of the more notable examples of compounds which may be prepared in accordance with the process of this invention are cortisone, hydro-cortisone, 1-dehydro-cortisone, 1-dehydro-hydro-cortisone, Reichstein's substance S and aldosterone. All of these compounds have established utility as therapeutic agents, particularly in the treatment of such diseases as arthritis and Addison's disease.

The following examples illustrate the invention:

*Example 1*

4 liters of 70 percent beer wort are sterilized in a shaking vessel (pH 5.6) and inoculated with a culture of *Ophiobolus herpotrichus*. After 3 days' shaking at 26° C., there is added under sterile conditions to the well-developed culture a solution of 1.0 gram of progesterone in 25 cc. of acetone and shaking is continued at the same temperature. After 4 days the mycelium is separated. The culture filtrate is extracted three times, in each case with 1 liter of ethyl acetate and the combined extracts are washed with N-hydrochloric acid, N-sodium bicarbonate solution and water. The ethyl acetate solution, dried over sodium sulfate, is evaporated under vacuum at 40° C. The residue (1.2 grams) is chromatographed on 15 grams of silica gel by elution first with methylene chloride, then with chloroform and finally with chloroform-acetone mixtures of increasing acetone content. The individual fractions (each 100 cc.) are evaporated and investigated by paper chromatography. The methylene chloride fractions and the first fractions eluted with chloroform contain together with impurities only starting material, whereas in the last chloroform fractions, and also in the chloroform-acetone eluates (95:5 and 90:10) cortexone (11-desoxy-corticosterone) is found to be present. The latter fractions are combined and evaporated. The residue, which consists for the most part of cortexone (0.81 gram) is recrystallized from ether, whereby colorless plates of M. P. 140–142° C. are obtained. These crystals possess an optical rotation of +175° and in admixture with an authentic sample show no reduction of the melting point. Their infra-red and ultra-violet spectra are also identical with those of cortexone.

*Example 2*

A 150 cc. quantity of a nutrient solution containing per liter 50 grams of crude glucose, 20 cc. of corn steep liquor and 10 grams of ammonium tartrate and the remainder tap water, is sterilized in a flask of 500 cc. capacity and inoculated with a culture of *Ophiobolus herpotrichus*. After 2 days' shaking at 26° C., the culture becomes well developed and there is then added under sterile conditions a solution of 30 mg. of 11-keto-progesterone in 1.5 cc. of acetone, and the entire mixture is further shaken for 3 days at the same temperature. The mycelium is then separated. The culture filtrate is extracted three times, in each case with 50 cc. of ethyl acetate, and the combined extracts are worked up as described in Example 1. The residue (40 mg.) is investigated by paper chromatography and consists for the most part of 11-dehydro-corticosterone (Kendall's compound A). This can be obtained in crystalline form by chromatographic purification on a silica gel column.

*Example 3*

To a culture of *Ophiobolus herpotrichus* such as that described in Example 2, there is added a solution of 30 mg. of 17α-hydroxy-progesterone, in 1.5 cc. of acetone. After incubation and extraction analogous to that set forth in Example 2, there is obtained a crude reaction product which consists for the most part of 17α-hydroxy-cortexone (Reichstein's substance S). This can be obtained in crystalline form by chromatographic purification on a silica gel column.

*Example 4*

A solution of 1 gram of 1-dehydro-progesterone in 25 cc. of acetone is added under sterile conditions to 4 liters of an agitated culture of *Ophiobolus herpotrichus*, obtained as described in Example 1. The mixture is agitated for 3 days at 27° C. and the mycelium is separated. The culture filtrate is extracted several times with a total of 3 liters of ethyl acetate. The combined extracts are washed with 1/10N-hydrochloric acid, 1N-sodium bicarbonate solution and water. The ethyl acetate solution is dried over sodium sulfate and evaporated under reduced pressure, and the residue obtained (1.1 gram) is chromatographed on 30 grams of silica gel, elution being carried out with chloroform and mixtures of chloroform and acetone with increasing contents of acetone. The individual fractions (100 cc. each) are evaporated and investigated by paper chromatography. In the chloroform fractions some starting material is found in addition to the impurities, while the fractions eluted with 95:5 mixtures of chloroform and acetone (710 mg.) consist chiefly of 1-dehydro-cortexone. The latter is crystallized from a mixture of acetone and petroleum ether. Its melting point is at 185–192° C., $[\alpha]_D^{22} = +120°$ (CHCl$_3$).

*Example 5*

A solution of 1 gram of 1-dehydro-11-keto-17α-hydroxy-progesterone in 25 cc. of acetone is added to a culture of *Ophiobolus herpotrichus* as set forth in Example 4 and the mixture is worked up and chromatographed as described in said example. The resultant chloroform-acetone (1:1) fractions consist chiefly of 1-dehydro-cortisone, which crystallizes from mixtures of acetone and ether. The melting point is at 231–233° C.

1-dehydro-11-keto-17α-hydroxy-progesterone can be prepared for example as follows: To a solution of 5 grams of 3,11,20-triketo-17α-hydroxy-allopregnane in 50 cc. of acetic acid containing a few drops of a concentrated solution of hydrogen bromide in acetic acid there are added 80 cc. of acetic acid containing 1 mol of bromine. After discoloration the second mol of bromine in 80 cc. of acetic acid is added and the mixture is stirred for 1 hour at room temperature. The reaction product is obtained by evaporating the solvent in vacuo, dissolving the residue in methylene chloride, washing the methylene chloride solution with water, dilute sodium bicarbonate solution and again with water and evaporating the solvent in vacuo. 5 grams of the so-obtained crude 2,4-dibromo-3,11,20-triketo-17α-hydroxy-allopregnane are heated with 20 cc. of collidine to about 170° C. After cooling, water is added to the reaction mixture and the reaction product is extracted with methylene chloride. The methylene chloride solution is washed with dilute sulfuric acid and water, dried and evaporated, whereby 1-dehydro-11-keto-17α-hydroxy-progesterone is obtained.

*Example 6*

A solution of 1 gram of 1-dehydro-11β,17α-dihydroxy-progesterone in 25 cc. of methanol is added to a culture of *Ophiobolus herpotrichus* as set forth in in Example 4, and the mixture is worked up and chromatographed as described in said example. The resultant chloroform-acetone-(1:1)-fractions consist chiefly of 1-dehydro-hydrocortisone. The product is crystallized from mixtures of acetone and ether. Its melting point is at 239–242° C.

By starting with 3,20-diketo-11β,17α-dihydroxy-allopregnane and following the same procedure as set forth in Example 5 for the preparation of 1-dehydro-11-keto-17α-hydroxy-progesterone there is obtained 1-dehydro-11β,17α-dihydroxy-progesterone.

*Example 7*

A 50 cc. quantity of beer wort of 70 percent strength is sterilized in a flask and inoculated with a culture of *Sclerotinia fructicola*. The culture is agitated at 27° C. for 4 days. There is then added, under sterile conditions, a solution of 10 mg. of progesterone in 0.5 cc. of acetone. The mixture is agitated for another 4 days at the same temperature, and the mycelium then separated. The culture filtrate is exhaustively extracted with ethyl acetate. The extract is washed with water, dried, and evaporated under reduced pressure. Paper-chromatographic investigation of the resulting crude extract shows that it consists for the most part of cortexone (11-desoxy-corticosterone).

*Example 8*

A solution of 10 mg. of 1-dehydro-11-keto-17α-hydroxy-progesterone in 0.5 cc. of acetone is added to a culture of *Sclerotinia fructicola* as set forth in Example 7 and the mixture is worked up and chromatographed as described in said example. The crude extract consists mainly of 1-dehydro-cortisone.

Example 9

A 120 cc. quantity of beer wort is sterilized in a flask of 500 cc. capacity and inoculated with *Ophiobolus herpotrichus*. The culture is agitated for 4 days at 26° C. A solution of 30 mg. of d,1-$\Delta^4$-3:20-diketo-11$\beta$-hydroxy-pregnene-18-acid-lactone-(18→11$\beta$) in 1.5 cc. of acetone is then added to the culture under sterile conditions and the mixture is agitated for an additional 3 days at 26° C. The culture is extracted with ethyl acetate as described in the preceding examples. The crude extract is worked up by a preparative paper chromatography (system propyleneglycol-toluene), a substance being separated off which is more highly polar than the starting material and reduces alkaline silver diamine solution rapidly and strongly. It is crystallized from a mixture of acetone and ether and is d,1-$\Delta^4$-3:20-diketo-11$\beta$:21-dihydroxy-pregnene-18-acid-lactone-(18→11$\beta$).

The d,1-$\Delta^4$-3:20-diketo-11$\beta$-hydroxy-pregnene-18-acid-lactone-(18→11$\beta$) can be prepared in accordance with the procedure set forth in detail in copending U. S. application Serial Number 480,062 filed January 5, 1955 by Tadeus Reichstein et al. In general, it may be stated that this compound is obtained by hydrogenating d,1-$\Delta^{5,16}$ - 3 - ethylenedioxy - 20 - keto - 11$\beta$ - hydroxy-pregnadiene-18-acid-lactone-(18→11$\beta$) in ethanol solution in the presence of a palladium strontium carbonate catalyst and splitting the ketal group in 3-position with p-toluene-sulfonic acid in acetone soluton to form d,1-$\Delta^4$ - 3:20 - diketo - 11$\beta$ - hydroxy - pregnene - 18 - acid-lactone-(18→11$\beta$).

What is claimed is:

1. In a process for the production of 21-hydroxylated pregnane compounds, the step which comprises subjecting a compound of the pregnane series, in which compound the 21-position is unsubstituted, to the action of enzymes produced by aerobically cultivating a fungus selected from the group consisting of the species *Ophiobolus herpotrichus* and *Sclerotinia fructicola*, and separating the resultant 21-hydroxylated steroid.

2. In a process for the production of 21-hydroxylated pregnane compounds, the step which comprises subjecting a $\Delta^{1,4}$-pregnadiene compound, in which compound the 21-position is unsubstituted, to the action of enzymes produced by aerobically cultivating a fungus selected from the group consisting of the species *Ophiobolus herpotrichus* and *Sclerotinia fructicola* and separating the resulting 21-hydroxylated steroid.

3. In a process for the production of 21-hydroxylated pregnane compounds, the step which comprises subjecting a compound of the pregnane series, in which compound the 21-position is unsubstituted, under aerobic conditions to the action of a growing fungus selected from the group consisting of the species *Ophiobolus herpotrichus* and *Sclerotinia fructicola*.

4. In a process for the production of 21-hydroxylated pregnane compounds, the step which comprises subjecting a compound of the pregnane series, in which compound the 21-position is unsubstituted, under aerobic conditions to the action of enzymes produced by aerobic cultivation of a fungus selected from the group consisting of the species *Ophiobolus herpotrichus* and *Sclerotinia fructicola*.

5. In a process for the production of $\Delta^4$-3,11,20-trioxo-21-hydroxy-pregnene the step which comprises subjecting 11-keto-progesterone to the action of a growing culture of a fungus of the species *Ophiobolus herpotrichus* and separating the so formed dehydro-corticosterone.

6. A process as set forth in claim 1, wherein the pregnane compound is progesterone.

7. A process as set forth in claim 1, wherein the pregnane compound is 11-keto-progesterone.

8. A process as set forth in claim 1, wherein the pregnane compound is 17$\alpha$-hydroxy-progesterone.

9. A process as set forth in claim 2, wherein the starting material is 1-dehydro-progesterone.

10. A process as set forth in claim 2, wherein the starting material is 1-dehydro-11-keto-17$\alpha$-hydroxy-progesterone.

11. A process as set forth in claim 2, wherein the starting material is 1-dehydro-11$\beta$,17$\alpha$-dihydroxy-progesterone.

References Cited in the file of this patent

Meystre et al.: Helvetica Chimica Acta, 37, 1954, pages 1548–1553.